United States Patent
Larson (10) Patent No.: US 12,196,252 B2
(45) Date of Patent: Jan. 14, 2025

(54) SYSTEMS, APPARATUSES, AND METHODS OF ARTICULATION OF A VARIABLE POSITION BALL JOINT

(71) Applicant: GM GLOBAL TECHNOLOGY OPERATIONS LLC, Detroit, MI (US)

(72) Inventor: Travis Larson, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 847 days.

(21) Appl. No.: 17/443,161

(22) Filed: Jul. 21, 2021

(65) Prior Publication Data

US 2023/0027194 A1 Jan. 26, 2023

(51) Int. Cl.
 *F16C 11/06* (2006.01)
(52) U.S. Cl.
 CPC ...... *F16C 11/0657* (2013.01); *F16C 11/0604* (2013.01); *F16C 2326/01* (2013.01)
(58) Field of Classification Search
 None
 See application file for complete search history.

(56) References Cited

U.S. PATENT DOCUMENTS

| | | | | |
|---|---|---|---|---|
| 2009/0065671 A1* | 3/2009 | Burgstaller | ......... | E04F 13/0808 |
| | | | | 248/288.11 |
| 2011/0150563 A1* | 6/2011 | Kuroda | ............... | F16C 11/0685 |
| | | | | 29/527.1 |
| 2014/0283337 A1* | 9/2014 | Triebold | ............. | F16C 11/0623 |
| | | | | 16/224 |
| 2018/0231051 A1* | 8/2018 | Klank | ................... | F16C 41/007 |

* cited by examiner

*Primary Examiner* — Daniel J Wiley
(74) *Attorney, Agent, or Firm* — Lorenz & Kopf LLP (57) ABSTRACT

Systems, apparatuses, and methods of a variable position ball joint with dynamic length are disclosed and include a ball, and a seat with a guide surface; an arc of the ball defines endpoints of an arc path for revolving the ball in the guide surface; a center point of the ball is concentric with a center of rotation of the seat so that the center point of the ball and the seat move in a single axis of movement; and an interface that guides the ball along the guide surface, wherein the guide surface is parallel to the single axis of movement to cause the ball to traverse the seat travel arc while maintaining a center of rotation concentric with the seat resulting in a change in length of an attached component with respect to a concentric center point of rotation during an articulation action of the ball joint.

20 Claims, 6 Drawing Sheets

SYSTEMS, APPARATUSES, AND METHODS OF ARTICULATION OF A VARIABLE POSITION BALL JOINT

INTRODUCTION

The technical field generally relates ball joints and more particularly relates to systems, apparatuses, and methods for a variable position ball joint that implements a spherical interface of a ball joint with at least one non-concentric arc to configure the ball with the seat to move the center of rotation of the ball joint along a defined path when the ball joint is articulated.

In general, the positioning of each wheel of a vehicle is determined by three primary measurements: camber, caster, and toe. The measurements are adjusted or standardized in accordance with the vehicle type. The camber or camber angle is the angle of the wheel relative to the vertical of the vehicle, and depending on the tilt, is either considered a positive or a negative camber angle.

The camber angle can be indicative of the load distribution across the tire tread. When the top of the tires tilt away from the center of the vehicle, the camber angle is positive, and when the top of the tires is tilted inward, the camber angle is negative. An improper camber angle setting may cause premature tire wear, for example, more tire wear on one edge. Alternately, a positive camber angle may cause the vehicle to pull more to one side. A negative camber angle may provide increased handling during cornering but reduces the contact surface between the tires and the road surface during straight-ahead driving thereby decreasing the overall life of the tire. Hence, a zero camber angle is generally deemed optional and will likely result in the most uniform tire wear over time. The optimal camber setting (usually a zero camber angle) is also dependent upon the vehicle type, and driving conditions of the vehicle.

The camber angle for a vehicle wheel is calibrated or preset by the manufacturer or by a technician, and the varying camber angles configured exert different effects on the vehicle. Further, vehicles with multiple ride heights are only aligned with a camber angle that is set at one ride height. This results in the tire orientation (toe/camber, etc) changing for different ride heights while the vehicle is in operation.

Hence, it is desirable to provide a mechanism that enables changes in tire orientation (i.e., vehicle's wheel camber angles) to be reduced or eliminated to keep the tire orientation consistent for vehicles that operate at different or multiple ride heights to improve tire wear, and vehicle dynamics when operating the vehicle.

Furthermore, other desirable features and characteristics of the present invention will become apparent from the subsequent detailed description and the appended claims, taken in conjunction with the accompanying drawings and the foregoing technical field and background.

SUMMARY

A system, apparatus, and method are disclosed for implementing a variable position ball joint containing a spherical interface of a ball joint with at least one non-concentric arc to configure the ball with a seat to move the center of rotation of the ball joint along a defined path when the ball joint is articulated.

In at least one exemplary embodiment, a system of a variable position ball joint with dynamic length change for an apparatus is provided. The system includes the variable position ball joint including a sphere with a top half and a bottom half, and a seat with a guide surface coupled together in the apparatus; the top half of the sphere including at least one arc that defines a first endpoint and a second endpoint of an arc path for revolving the sphere in the guide surface configured in the seat; a center point of the top half of the sphere configured to be concentric with a center of rotation of the seat to ensure that the center point of the sphere's top half and the seat move in a single axis of movement; and an interface configured to guide the sphere in the seat along the guide surface wherein the guide surface is parallel to the single axis of movement to cause the sphere to traverse in a seat travel arc of the seat while maintaining a center of rotation concentric with the seat resulting in a change in length of an attached component to the apparatus with respect to a concentric center point of rotation during an articulation action of the variable position ball joint.

In at least one exemplary embodiment, the system includes the arc path having a radius measured from the center point of the sphere across the top half of the sphere that has a distance sufficient to enable constant contact with the guide surface of the seat as the sphere is traversing the seat travel arc.

In at least one exemplary embodiment, the system including the sphere and the seat are constructed in a plurality of different shapes configured to revolve together while still maintaining the concentric center of rotation about each element's respective center.

In at least one exemplary embodiment, the system includes a set of multiple arcs configured to make up the arc path of the sphere wherein the first and second endpoints are defined between the set of multiple arcs.

In at least one exemplary embodiment, the system includes the set of multiple arcs implemented in the variable position ball joint in a manner that does not cause interference while the sphere is traversing the seat travel arc of the seat.

In at least one exemplary embodiment, the articulation action of the variable position ball joint includes a traversal of the seat travel arc by the sphere between the first and second endpoints resulting in the change in the length of the attached component to the apparatus with respect to a concentric center point of rotation.

In at least one exemplary embodiment, the sphere includes a metallic material and the seat includes a plastic-type material for a vehicle type and a load in operation.

In at least one exemplary embodiment, the system includes a first position of articulation of the variable position ball joint with a position change that enables the articulation action from a normal rotation of the sphere in the seat; and the second position of articulation, opposite to the first position of articulation, of the variable position ball joint with the position change that enables the articulation action from the normal rotation of the sphere in the seat.

In another at least one exemplary embodiment, an apparatus coupled to an attached component is provided. The apparatus includes a variable position ball joint including a ball with a top half and a bottom half, and a socket with a guide surface coupled together in the apparatus; the top half of the ball includes at least one arc that defines a first endpoint and the second endpoint of an arc path to revolve the ball in the guide surface configured in a seat of the socket; a center point of the top half of the ball configured to be concentric with a center of rotation of the seat of the socket to ensure that the center point of the ball's top half and the seat of the socket move in a linear axis of movement; and an interface configured to guide the ball the seat in the socket along the guide surface wherein the guide surface is parallel to the linear axis of movement to cause the ball to traverse in a travel arc of the seat of the socket while maintaining a center of rotation concentric with the socket resulting in a change in length of the attached component to the apparatus with respect to a concentric center point of rotation during an articulation action of the variable position ball joint.

In another at least one exemplary embodiment, the apparatus includes the arc path having a radius measured from the center point of the ball across the top half of the ball that has a distance sufficient to enable constant contact with the guide surface of the seat of the socket as a ball traverses the travel arc of the seat of the socket.

In another at least one exemplary embodiment, the apparatus includes the ball and seat of the socket constructed in a plurality of different shapes configured to revolve together while still maintaining the concentric center of rotation about each element's respective center.

In another at least one exemplary embodiment, the apparatus includes a set of multiple arcs configured to make up the arc path of the ball wherein the first and second endpoints are defined between the set of multiple arcs.

In another at least one exemplary embodiment, the apparatus includes the set of multiple arcs implemented in the variable position ball joint in a manner that does not cause interference while the ball traverses the travel arc of the seat of the socket.

In another at least one exemplary embodiment, the articulation action of the variable position ball joint includes a traversal of the travel arc of the seat of the socket by the ball between the first and second endpoints resulting in the change in the length of the attached component to the apparatus with respect to the concentric center point of rotation.

In another at least one exemplary embodiment, the ball includes a metallic material and the seat of the socket includes a plastic-type material particular for a vehicle type and a load in operation.

In another at least one exemplary embodiment, the apparatus includes a first position of articulation of the variable position ball joint with a position change that enables the articulation action from a normal rotation of the ball in the seat of the socket; and the second position of articulation, opposite to the first position of articulation, of the variable position ball joint with the position change that enables the articulation action from the normal rotation of the ball in the seat of the socket.

In yet another exemplary embodiment, a method to articulate a variable position ball joint with an attached component of an apparatus is provided. The method includes configuring the variable position ball joint with a sphere of a top half and a bottom half, and a seat with a guide surface coupled together in the apparatus wherein the top half of the sphere includes at least one arc that defines the first endpoint and the second endpoint of an arc path for revolving the sphere over the guide surface in the seat; configuring a center point of the top half of the sphere to be concentric with a center of rotation of the seat to ensure that the center point of the sphere's top half and the seat move in a linear axis of movement; and configuring an interface to guide the sphere in the seat along the guide surface wherein the guide surface is parallel to the linear axis of movement to cause the sphere to traverse in a seat travel arc of the seat while maintaining a center of rotation concentric with the seat resulting in a change in length of the attached component to the apparatus with respect to a concentric center point of rotation during an articulation action of the variable position ball joint.

In yet another at least one exemplary embodiment, the method includes determining the arc path with a radius from the center point of the sphere across the top half of the sphere that has a distance sufficient to enable constant contact with the guide surface of the seat as the sphere is traversing the seat travel arc.

In yet another at least one exemplary embodiment, the method includes configuring the sphere and seat in a plurality of different shapes that revolve together while still maintaining the concentric center of rotation about each element's respective center.

In yet another, at least one exemplary embodiment, the articulation action of the variable position ball joint includes a traversal of the seat travel arc by the sphere between the first and second endpoints resulting in the change in the length of the attached component to the apparatus with respect to the concentric center point of rotation.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

The present disclosure describes systems, apparatuses, and methods of a series of non-concentric arcs of a ball (or sphere) and socket that provide defined movement of the center of rotation as the joint is articulated which causes a length from the center of rotation of the ball joint to the center of rotation at the opposite side of the component to change during the articulation action.

The present disclosure describes systems, apparatuses, and methods that implement a ball (or sphere) in a variable position ball joint where the ball or sphere is implemented without a fixed center of rotation thereby causing a dynamic change in the length from the center of rotation of the ball or sphere to the center of rotation at the opposite side of the component during the articulation action.

The terms "ball" and "sphere" refer to an object of a roundish, spheroid, ellipsoid, or similar shape that is made up of two halves of a top half and a bottom half coupled together in a manner having exterior contact points on either side that are capable of contacting a cavity in which the ball or sphere are contained. For example, the terms include a spheroid shape or rotational ellipsoid with circular symmetry about the major axis. Another exemplary embodiment consists of a prolate spheroid, football, or rugby ball. In another exemplary embodiment, the ball or sphere consists of an oval or ovoid shape with portions that include elliptic curves or arcs. In another exemplary embodiment, the terms ball and sphere refer to an egg shape which is approximated by the "long" half of a prolate spheroid, joined to a "short" half of a roughly spherical ellipsoid, or even a slightly oblate spheroid which is joined at the equator and share a principal axis of rotational symmetry. In this exemplary embodiment, the term egg-shaped can include a lack of reflection symmetry across the equatorial plane.

The present disclosure describes systems, apparatuses, and methods that define a nominal position of the ball joint and the expected ball diameter, and also defines two additional positions of the ball joint using articulation angles and position changes from the nominal position.

The present disclosure describes systems, apparatuses, and methods that construct an arc through the endpoints to define the path of the ball (or sphere) where the centers of multiple arcs are not coincident, and generate the shape of the ball or sphere via the multiple arcs in a manner to not cause interference between the ball and the socket when the joint is articulated. In an exemplary embodiment, the multiple arcs are constructed to ensure that a radius is always in contact with the seat.

The present disclosure describes systems, apparatuses, and methods where the center portion of the top side of the ball is constructed concentric with the center of rotation to ensure the center point only moves along one axis. In an exemplary embodiment, a guide surface is configured parallel to the axis of movement must be constructed in the seat that the arc rides along.

The present disclosure describes systems, apparatuses, and methods where the shape for the ball (or sphere) and socket revolve about their respective centers to complete a ball and socket interface. In an exemplary embodiment, the ball may be made of steel or other metallic alloys, and the seat may be made of a plastic, polymer, or resin (POM) material in which for both components, the material make up exhibits typical Hertz contact stress for ball joint components. However, the ball and seat may require an increase in size in the range of 20% in diameter to compensate or contain stresses, this size increase is dependent on the vehicle type, configurations, and allowable range requirements for the vehicle and loads.

Figure 1:
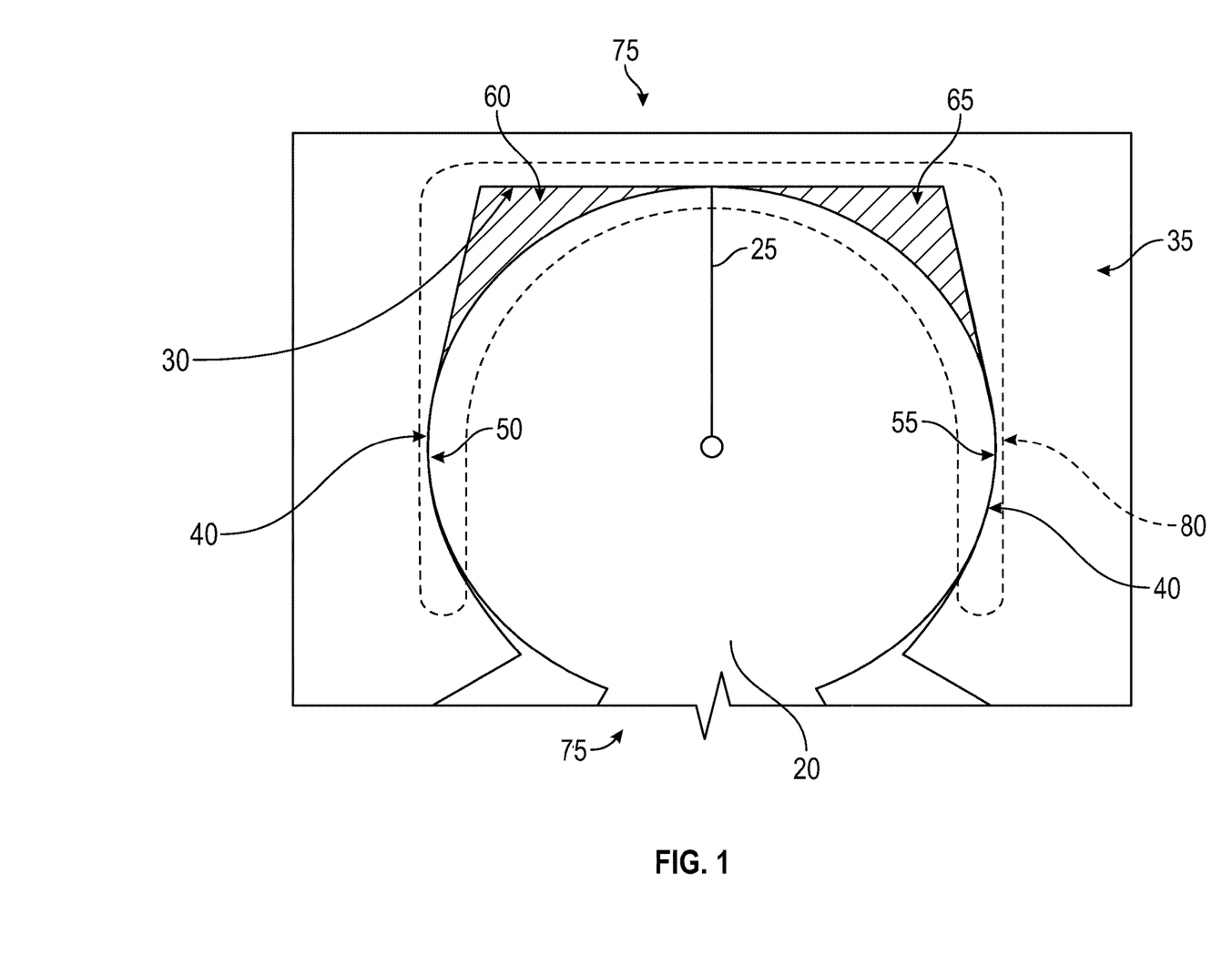
FIG. 1 illustrates an exemplary diagram of a side view of an exemplary variable position ball joint that at least includes a ball (or sphere) with a spherical interface that includes concentric arcs, a guide surface and a seat travel arc, and a seat of a socket of an exemplary variable position ball joint system in accordance with exemplary embodiments.

FIG. 1 illustrates an exemplary diagram of a side view of an exemplary variable position ball joint that at least includes a ball (or sphere) with a spherical interface that includes concentric arcs, a guide surface and a seat travel arc, and a seat of a socket of an exemplary variable position ball joint system in accordance with exemplary embodiments. In FIG. 1, there is depicted an exemplary variable position ball joint system 10 with multiple arcs on the ball 20, guide surface 30, seat 35, radii 25 of the ball (or sphere) 20, and seat travel arc 40. The ball (or sphere) 20 is contained or coupled in seat 35 of a joint (not shown) to form an assembly of the ball joint.

In an exemplary embodiment, the seat travel arc 40 includes two endpoints (50, 55) with contact the surface of the ball 20. The top part of the ball 20 revolves or rotates about the guide surface 30 of the seat 35. Portions 60, 65 of the seat 35 are not in contact with the ball 20. A center point 70 of the ball is concentric with a center of rotation of the seat 35 and the seat 35 moves in one axis or one degree of freedom (not shown) of movement. The interface 80 includes the guide surface 30 which is parallel to the single or linear axis of movement to cause the ball 20 to traverse in the entire or part of the seat travel arc 40 of the seat 35 while maintaining a center of rotation (in this case at the center point 70) concentric with the seat 35. As the ball 20 travels along the seat travel arc 40 this results in a change in length of an attached component 75 (i.e., the attached component can be attached to either the seat or ball or both) to the ball 20 and seat 35 assemblies with respect to the concentric center point of rotation during an articulation action of the variable position ball joint.

Figure 2:
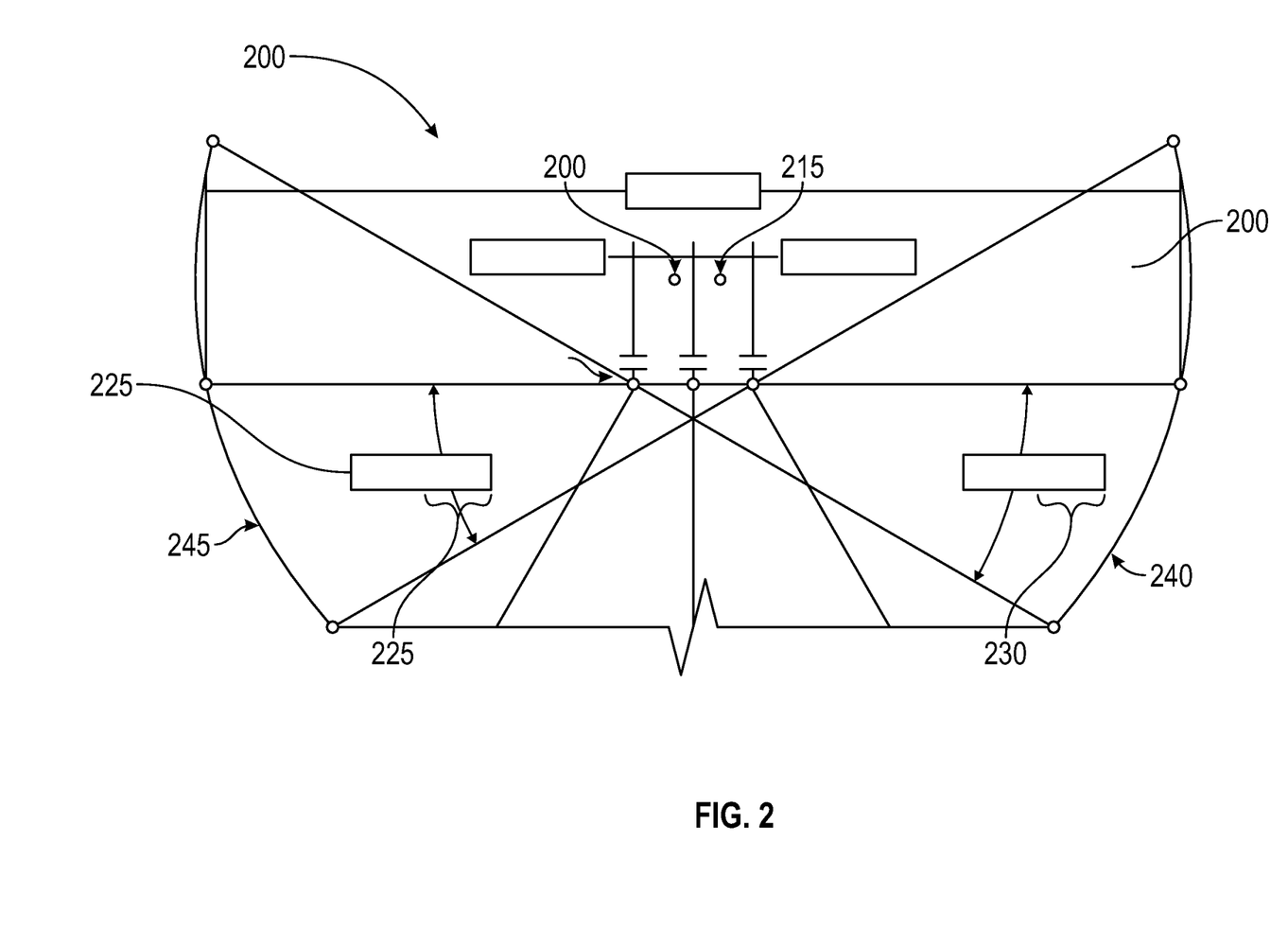
FIG. 2 illustrates an exemplary diagram of a side view depicting at least locations of arc centers, an axis of movement, and radii of the exemplary variable position ball joint system in accordance with exemplary embodiments.

FIG. 2 illustrates an exemplary diagram of a side view depicting at least locations of arc centers, an axis of movement, and radii of the exemplary variable position ball joint system in accordance with exemplary embodiments. In FIG. 2, in the exemplary diagram, there is depicted an arc of the ball 20 with the endpoints 205, 210 to define the path of ball 20. In this case, the centers of the two arcs 200, 215 are not coincident. To generate the shape of ball 20, multiple arcs 200, 215 are used to ensure that no interference exists between ball 20 and the socket (not shown) when the ball joint is articulated. The arcs 200, 215 must also be constructed to ensure that a radius 25 (of FIG. 1) is always in contact with seat 35. The arc path has a radius 25 (of FIG. 1) measured from the center point of the ball 20 across the top half of the ball that has a distance sufficient to enable constant contact with the guide surface 30 (of FIG. 1) of the seat 35 as the ball 20 is traversing the seat travel arc (i.e., arc path 240, 245) with a corresponding articulation action occurring of +/−30 degrees (225, 230) of the variable position ball joint. There also occurs a position change from ρ128:30:00 to ρ126:30:00 with the articulation action of +/−30 degrees (225, 230) between the first and second endpoints of the ball 20 arcs resulting in the change in the length of the attached component to the apparatus with respect to a concentric center point of rotation. Also, as the arc centers change from the nominal position at ρ128:30:00 that results in a length change from the center point of rotation of the attached component changes by 2:00 mm at ρ129:2.00 to ρ130:2.00.

Figure 3A:
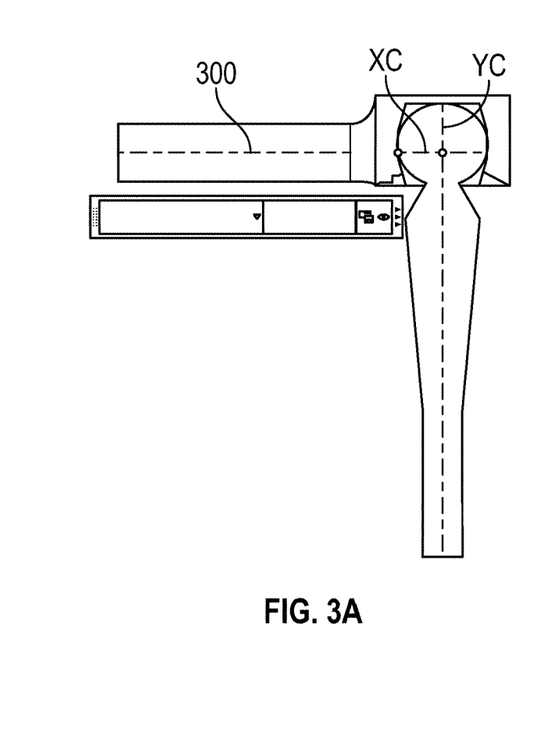
FIGS. 3A, 3B, and 3C illustrate exemplary diagrams of side views of positions of kinematic rotation of a ball or sphere in a seat of a socket along a path when the exemplary variable position ball joint is articulated of the exemplary variable position ball joint system in accordance with exemplary embodiments.
Figures 3B, 3C:
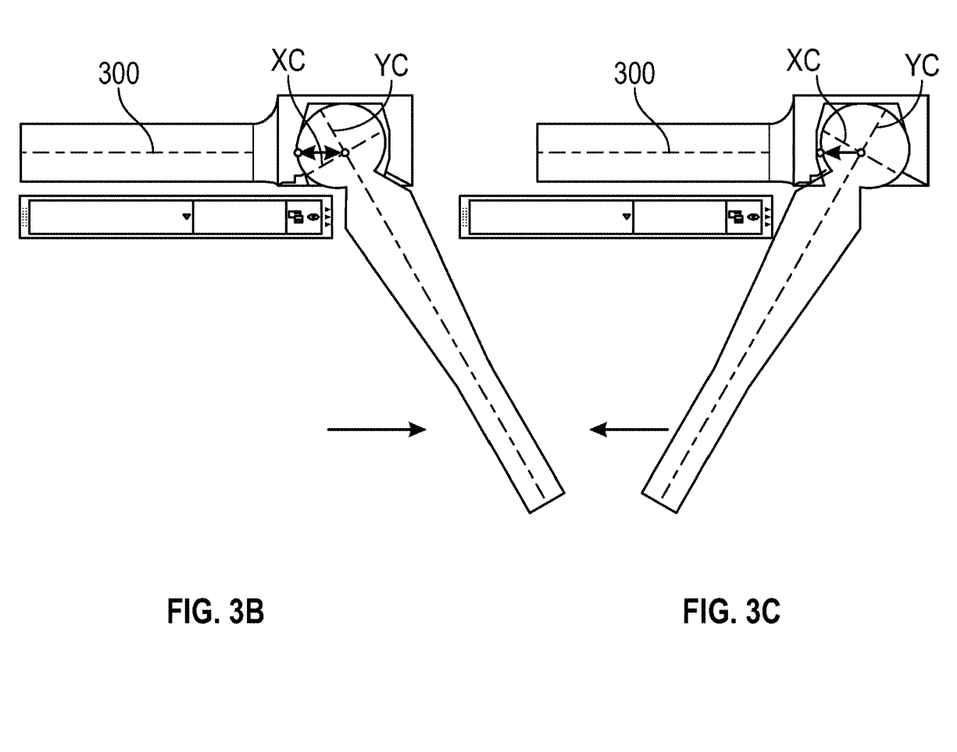

FIGS. 3A, 3B, and 3C illustrate exemplary diagrams of side views of positions of kinematic rotation of a ball (or sphere) in a seat of a socket along a path when the exemplary variable position ball joint incurs an articulation action by the exemplary variable position ball joint system in accordance with exemplary embodiments. In FIG. 3A, the variable position ball joint is depicted in a nominal position with the ball center of rotation XC that can move when articulated to the center of rotation YC along the defined path. Hence, when changing the attached component angular position by an articulation action of the variable position ball joint, the length defined by the center of rotation is changed by 2 mm at +/−30 degrees as depicted in FIGS. 3A and 3B. The variable position ball joint moves via the kinematic point of rotation of the ball along the defined path causing the effective length change when the joint is articulated. The effective change in length of the attached component 300 assembled to the ball joint is changed from 118.00 mm in FIG. 3B to 114.00 mm in FIG. 3C or 2 mm at +/−30 degrees from the nominal position in FIG. 3A.

In an exemplary embodiment, when the ball joint is not articulated in either direction, the attached component 300 is at a nominal position and the distance as defined with an expected ball diameter of 32 mm (in FIG. 2) is between both articulated positions in either direction of the variable position ball joint. The attached component 300 distance is at 116.00 mm. while in FIGS. 3A and 3B, the two additional positions of the ball joint using the articulation angle and position change from the nominal position of FIG. 3A causes the change in the center of rotation of about 2 mm at +/−30 degrees articulation of the ball joint.

Figure 4A:
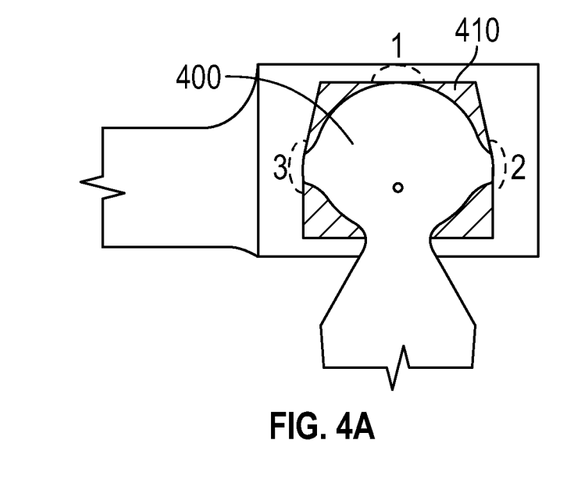
FIGS. 4A, 4B, and 4C illustrate exemplary diagrams of illustrates exemplary diagrams of side views of alternate different ball (or sphere) design shapes implemented in the exemplary variable position ball joint system in accordance with exemplary embodiments.
Figure 4B:
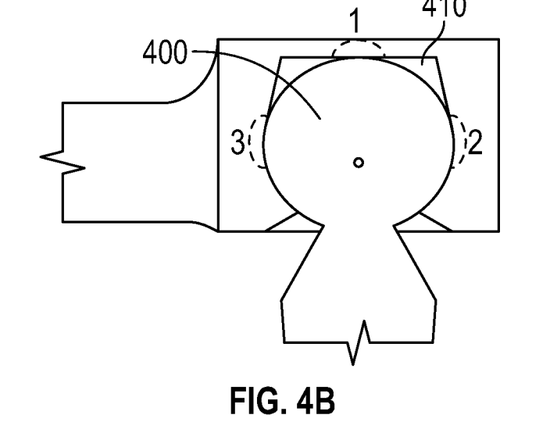
Figure 4C:
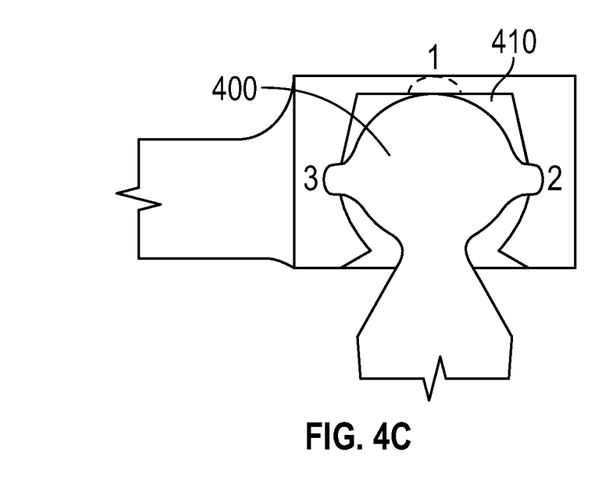

FIGS. 4A, 4B, and 4C illustrate exemplary diagrams of illustrates exemplary diagrams of side views of alternate different ball or sphere design shapes implemented in the exemplary variable position ball joint system in accordance with exemplary embodiments. In FIGS. 4A, 4B, and 4C, the sphere 400 and the seat 410 are constructed in a plurality of different shapes configured to revolve together while still maintaining the concentric center of rotation about each element's respective center, and also maintaining three functional contact surfaces in each shape configuration to ensure that the arcs of the different shaped sphere 400 have a radius that is always in contact with the seat 410.

Figure 5:
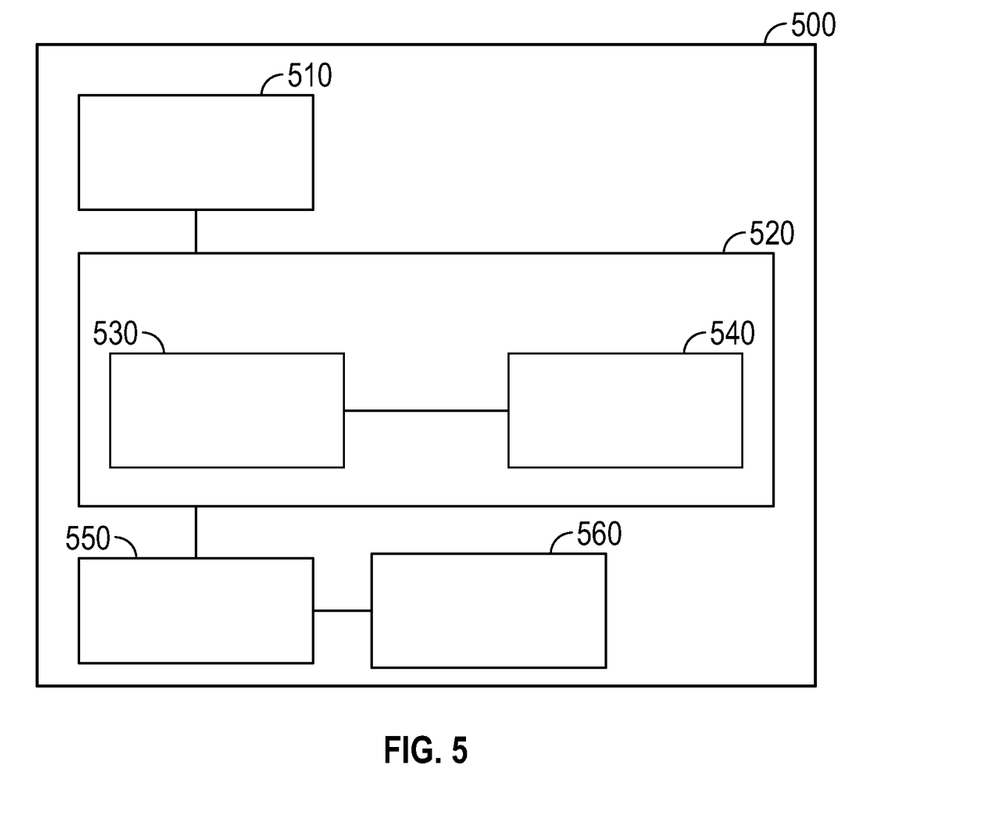
FIG. 5 illustrates an exemplary diagram of the suspension system of a vehicle with an adjustable height coupled to the variable position ball joint and vehicle wheel that is responsive to changes in vehicle height to change the accessory component length to the concentric center of rotation by the exemplary variable position ball joint system in accordance with the exemplary embodiments.

FIG. 5 illustrates an exemplary diagram of the suspension system of a vehicle with an adjustable height coupled to the variable position ball joint and wheel that is responsive to changes in vehicle height to change the accessory component length to the concentric center of rotation by the exemplary variable position ball joint system in accordance with the exemplary embodiments. In FIG. 5 there is depicted a vehicle 500 that includes a controller 510 in communication with the vehicle suspension system 520 to adjust the vehicle height, and the variable position ball joint system 530 coupled or integrated with the vehicle suspension system 520. The variable position ball joint system 530 is responsive to changes in the vehicle height by an articulation action that causes the length from the center of rotation of the ball joint to the center of rotation at the opposite side of component 540 attached to change. This, in turn, results in an adjustment by the dynamic change of length by the vehicle suspension system 520 to not cause the camber angle for the vehicle wheel 550 to change and the vehicle wheel 550 to stay aligned (i.e, adjust the tire orientation 560) with the vehicle height change while the vehicle is in operation. The adjustment provides for a tire orientation 560 (toe/camber, etc) to correspond to different ride heights increasing tire tread life by causing more uniform tire wear at the different vehicle heights.

Figure 6:
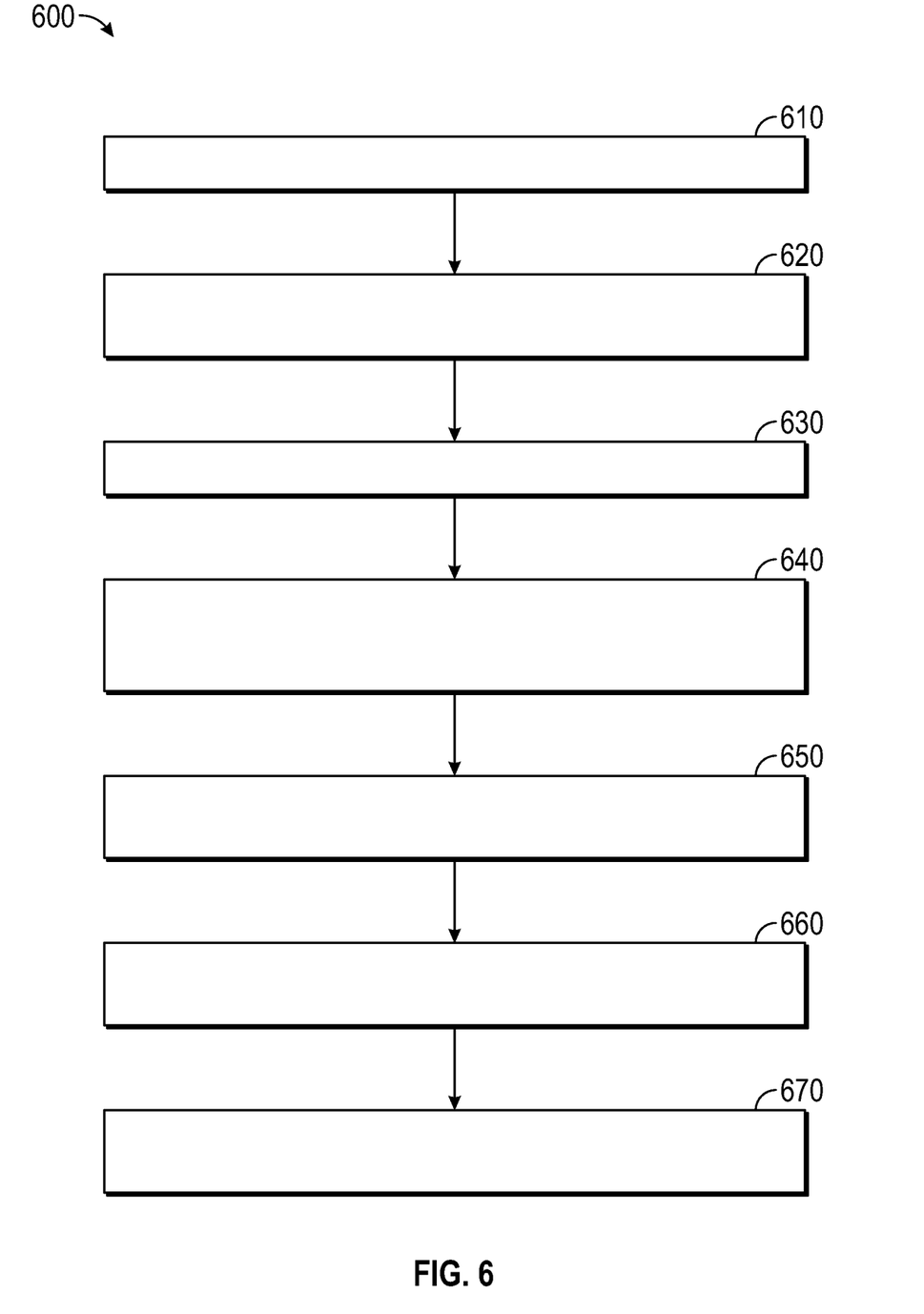
FIG. 6 illustrates an exemplary flowchart of a process of a responsive articulation action by the exemplary variable position ball joint system in accordance with the exemplary embodiments.

FIG. 6 illustrates an exemplary flowchart of a process of an articulation action responsive to a vehicle height change of the exemplary variable position ball joint system in accordance with the exemplary embodiments. The exemplary process of the flowchart 600 in FIG. 6 describes keeping the consistent tire orientation by preventing changes of the camber angle so that the tire orientation by an articulation action of the variable position ball joint in response to the vehicle height change, corresponds or is adjusted for consistency. At step 610, a driver of a vehicle may initiate a vehicle height adjustment to raise or lower the vehicle height, or the vehicle may be equipped with an automated adaptive mechanism to change the vehicle height. For example, some vehicles may be equipped with a height-adjustable suspension mechanism that the ride height or ground clearance of the vehicle can be varied by the driver, or can be instituted via automated adaptive vehicle applications. This may be done for various reasons including giving better ground clearance over rough terrain, or a lower ground clearance to improve performance and fuel economy at high speed.

In an exemplary embodiment, the Air Ride Adaptive Suspension, or Air Ride is a GENERAL MOTORS® chassis and suspension technology that is capable of dynamically raising or lowering the vehicle's ride height. The described variable position ball joint system incorporated and configured in the suspension system may be implemented with this system with a responsive articulation action to adjust the vehicle's wheels orientation for tire orientation (i.e., camber).

At step 620, in response to the vehicle height change, and articulation action occurs by the variable position ball joint system.

At step 630, a traversal of the seat travel arc by the ball takes place between the first and second endpoints of an arc path of the ball resulting in the change in the length of the attached component to the apparatus with respect to the concentric center point of rotation.

At step 640, the change in the length of the attached component takes place that is resultant on the ball movement as it is guided in the seat along the guide surface of the seat of the socket because the guide surface is parallel to the linear axis of movement and causes the ball while traversing the seat travel arc of the seat to maintain the center of rotation concentric with the seat.

At step 650, the ball is kept in constant contact with the seat as the arc path because a point if the ball is always in contact with the seat. With this in mind, a radius of the ball is determined from the center point of the ball across the top half of the ball to allow for the constant contact (at one of 3 points, see FIGS. 4A-C) with the seat as the ball traverses the guide surface.

At step 660, the ball joint is articulated either to a first or second position using an articulation angle and position change from a nominal position for two additional positions of the ball joint using articulation angle and position change from nominal position change in center of rotation that is about 2 mm with a +/−30 degrees rotation of the attached component.

At step 670, as a result of the change in the length, there is an adjustment in the camber angle of the wheels by the vehicle suspension system that includes the variable ball joint and attached component to cause the tire orientation to adjust to the corresponding change in vehicle height and the surface area of the tire to be more uniformly exposed to the ground during a driving operation.

It should be appreciated that the process of FIG. 6 may include any number of additional or alternative tasks, the tasks are shown in FIG. 6 need not be performed in the illustrated order, and the process of FIG. 6 may be incorporated into a more comprehensive procedure or process having additional functionality not described in detail herein. Moreover, one or more of the tasks shown in FIG. 6 may be omitted from an embodiment of the process shown in FIG. 6 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes may be made in the function and arrangement of elements without departing from the scope of the disclosure as set forth in the appended claims and the legal equivalents thereof.

What is claimed is:

1. A system of a variable position ball joint with dynamic length change for an apparatus, comprising:
   the variable position ball joint comprising a sphere with a top half and a bottom half, and a seat with a guide surface coupled together in the apparatus;
   the top half of the sphere comprising at least one arc that defines a first endpoint and a second endpoint of an arc path for revolving the sphere in the guide surface configured in the seat;
   a center point of the top half of the sphere configured to be concentric with a center of rotation of the seat to ensure that the center point of the sphere's top half and the seat move in a single axis of movement; and
   an interface configured to guide the sphere in the seat along the guide surface wherein the guide surface is parallel to the single axis of movement to cause the sphere to traverse in a seat travel arc of the seat while maintaining the center of rotation concentric with the seat resulting in a change in length of an attached component to the apparatus with respect to a concentric center point of rotation during an articulation action of the variable position ball joint.

2. The system of claim 1, further comprising:
   the arc path having a radius measured from the center point of the sphere across the top half of the sphere that has a distance sufficient to enable constant contact with the guide surface of the seat as the sphere is traversing the seat travel arc.

3. The system of claim 2, further comprising:
   the sphere and the seat are constructed in a plurality of different shapes configured to revolve together while still maintaining the concentric center of rotation about each element's respective center.

4. The system of claim 3, further comprising:
   a set of multiple arcs configured to make up the arc path of the sphere wherein the first and second endpoints are defined between the set of multiple arcs.

5. The system of claim 4, further comprising:
   the set of multiple arcs implemented in the variable position ball joint in a manner that does not cause interference while the sphere is traversing the seat travel arc of the seat.

6. The system of claim 5, wherein the articulation action of the variable position ball joint comprises a traversal of the seat travel arc by the sphere between the first and second endpoints resulting in the change in the length of the attached component to the apparatus with respect to a concentric center point of rotation.

7. The system of claim 6, wherein the sphere comprises a metallic material and the seat comprises a plastic-type material for a vehicle type and a load in operation.

8. The system of claim 7, further comprising:
   a first position of articulation of the variable position ball joint with a position change that enables the articulation action from a normal rotation of the sphere in the seat; and
   a second position of articulation, opposite to the first position of articulation, of the variable position ball joint with the position change that enables the articulation action from the normal rotation of the sphere in the seat.

9. An apparatus coupled to an attached component, comprising:
   a variable position ball joint comprising a ball with a top half and a bottom half, and a socket with a guide surface coupled together in the apparatus;
   the top half of the ball comprises at least one arc that defines a first endpoint and the second endpoint of an arc path to revolve the ball in the guide surface configured in a seat of the socket;
   a center point of the top half of the ball configured to be concentric with a center of rotation of the seat of the socket to ensure that the center point of the ball's top half and the seat of the socket move in a linear axis of movement; and
   an interface configured to guide the ball the seat in the socket along the guide surface wherein the guide surface is parallel to the linear axis of movement to cause the ball to traverse in a travel arc of the seat of the socket while maintaining the center of rotation concentric with the socket resulting in a change in length of the attached component to the apparatus with respect to a concentric center point of rotation during an articulation action of the variable position ball joint.

10. The apparatus of claim 9, further comprising:
    the arc path having a radius measured from the center point of the ball across the top half of the ball that has a distance sufficient to enable constant contact with the guide surface of the seat of the socket as a ball traverses the travel arc of the seat of the socket.

11. The apparatus of claim 10, further comprising:
the ball and seat of the socket constructed in a plurality of different shapes configured to revolve together while still maintaining the concentric center of rotation about each element's respective center.

12. The apparatus of claim 11, further comprising:
a set of multiple arcs configured to make up the arc path of the ball wherein the first and second endpoints are defined between the set of multiple arcs.

13. The apparatus of claim 12, further comprising:
the set of multiple arcs implemented in the variable position ball joint in a manner that does not cause interference while the ball traverses the travel arc of the seat of the socket.

14. The apparatus of claim 13, wherein the articulation action of the variable position ball joint comprises a traversal of the travel arc of the seat of the socket by the ball between the first and second endpoints resulting in the change in the length of the attached component to the apparatus with respect to the concentric center point of rotation.

15. The apparatus of claim 14, wherein the ball comprises a metallic material and the seat of the socket comprises a plastic-type material determined for a vehicle type and a load in operation.

16. The apparatus of claim 15, further comprising:
a first position of articulation of the variable position ball joint with a position change that enables the articulation action from a normal rotation of the ball in the seat of the socket; and
a second position of articulation, opposite to the first position of articulation, of the variable position ball joint with the position change that enables the articulation action from the normal rotation of the ball in the seat of the socket.

17. A method to articulate a variable position ball joint with an attached component of an apparatus, comprising:
configuring the variable position ball joint with a sphere of a top half and a bottom half, and a seat with a guide surface coupled together in the apparatus wherein the top half of the sphere includes at least one arc that defines a first endpoint and a second endpoint of an arc path for revolving the sphere over the guide surface in the seat;
configuring a center point of the top half of the sphere to be concentric with a center of rotation of the seat to ensure that the center point of the sphere's top half and the seat move in a linear axis of movement; and
configuring an interface to guide the sphere in the seat along the guide surface wherein the guide surface is parallel to the linear axis of movement to cause the sphere to traverse in a seat travel arc of the seat while maintaining the center of rotation concentric with the seat resulting in a change in length of the attached component to the apparatus with respect to a concentric center point of rotation during an articulation action of the variable position ball joint.

18. The method of claim 17, further comprising:
determining the arc path with a radius from the center point of the sphere across the top half of the sphere that has a distance sufficient to enable constant contact with the guide surface of the seat as the sphere is traversing the seat travel arc.

19. The method of claim 18, further comprising:
configuring the sphere and seat in a plurality of different shapes that revolve together while still maintaining the concentric center of rotation about each element's respective center.

20. The method of claim 19, wherein the articulation action of the variable position ball joint comprises a traversal of the seat travel arc by the sphere between the first and second endpoints resulting in the change in the length of the attached component to the apparatus with respect to the concentric center point of rotation.

* * * * *